United States Patent
Hupfield

(10) Patent No.: US 7,645,518 B2
(45) Date of Patent: Jan. 12, 2010

(54) POLYMERIC PRODUCTS USEFUL AS OIL REPELLENTS

(75) Inventor: Peter Hupfield, Carmarthen (GB)

(73) Assignee: Dow Corning Corporation, Midland, MI (US)

( * ) Notice: Subject to any disclaimer, the term of this patent is extended or adjusted under 35 U.S.C. 154(b) by 141 days.

(21) Appl. No.: 10/574,679

(22) PCT Filed: Nov. 12, 2004

(86) PCT No.: PCT/US2004/038481

§ 371 (c)(1),
(2), (4) Date: Apr. 4, 2006

(87) PCT Pub. No.: WO2005/052030

PCT Pub. Date: Jun. 9, 2005

(65) Prior Publication Data

US 2007/0059537 A1 Mar. 15, 2007

(30) Foreign Application Priority Data

Nov. 21, 2003 (GB) ................... 0327067.5

(51) Int. Cl.
*B32B 33/00* (2006.01)
*C08G 77/04* (2006.01)
*C08L 83/04* (2006.01)

(52) U.S. Cl. .............. 428/447; 528/25; 528/28
(58) Field of Classification Search .......... 528/28, 528/25

See application file for complete search history.

(56) References Cited

U.S. PATENT DOCUMENTS

| | | | | | |
|---|---|---|---|---|---|
| 3,068,187 | A | * | 12/1962 | Bolstad et al. | 524/533 |
| 3,637,614 | A | * | 1/1972 | Elkind et al. | 526/245 |
| 3,686,356 | A | * | 8/1972 | Saam | 525/64 |
| 3,809,663 | A | * | 5/1974 | Greenwood | 524/53 |
| 4,070,152 | A | * | 1/1978 | Pentz | 8/115.6 |
| 4,316,941 | A | * | 2/1982 | Eguchi et al. | 428/421 |
| 4,321,306 | A | * | 3/1982 | Eguchi | 428/421 |
| 4,661,577 | A | * | 4/1987 | Jo Lane et al. | 528/10 |
| 4,705,704 | A | * | 11/1987 | Lane et al. | 427/389.9 |
| 5,021,527 | A | * | 6/1991 | Ohmori et al. | 526/245 |
| 5,068,295 | A | * | 11/1991 | Misaizu et al. | 526/245 |
| 5,110,621 | A | * | 5/1992 | Sudo et al. | 427/503 |
| 5,194,542 | A | * | 3/1993 | Iwamoto et al. | 526/246 |
| 5,194,556 | A | * | 3/1993 | Mueller et al. | 528/28 |
| 5,247,008 | A | * | 9/1993 | Michels et al. | 524/544 |
| 5,328,794 | A | * | 7/1994 | Kazuo et al. | 430/109.3 |
| 5,536,304 | A | * | 7/1996 | Coppens et al. | 252/8.57 |
| 5,883,185 | A | * | 3/1999 | Matsumura et al. | 524/838 |
| 6,472,019 | B1 | * | 10/2002 | Yamaguchi et al. | 427/354 |
| 6,582,620 | B2 | * | 6/2003 | Miyadai et al. | 252/8.62 |
| 6,646,043 | B2 | * | 11/2003 | Funaki et al. | 524/800 |
| 7,091,283 | B2 | * | 8/2006 | Muller et al. | 525/292 |
| 7,238,768 | B2 | * | 7/2007 | Hupfield et al. | 528/38 |
| 2007/0208152 | A1 | * | 9/2007 | Hupfield | 526/245 |

* cited by examiner

*Primary Examiner*—Randy Gulakowski
*Assistant Examiner*—Robert Loewe
(74) *Attorney, Agent, or Firm*—Alan Zombeck

(57) ABSTRACT

Polymeric products are disclosed that are suitable for application to fibrous substrates such as textiles, leather and paper, to impart oil (oleophobicity) and water repellent (hydrophobicity) properties to the treated material. The polymeric products comprise an amino-functional polysiloxane bonded through its amino groups to an addition copolymer of a fluoro-substituted alkyl ester of an olefinically unsaturated carboxylic acid and an olefinically unsaturated monomer having a functional group capable of reacting with the amino groups of polysiloxane and optionally one or more olefinically unsaturated comonomers.

9 Claims, No Drawings

POLYMERIC PRODUCTS USEFUL AS OIL REPELLENTS

CROSS REFERENCE TO RELATED APPLICATIONS

This application is a U.S. national stage filing under 35 U.S.C. § 371 of PCT Application No. PCT/US2004/038481 filed on Nov. 12, 2004, which claims the benefit of GB Patent Application No. 0327067.5 filed Nov. 21, 2003 under 35 U.S.C. § 119(a)-(d) and 35 U.S.C. § 365(a). PCT Application No. PCT/US2004/038481 and GB Patent Application No. 0327067.5 are hereby incorporated by reference.

This invention relates to polymeric products suitable for application to fibrous substrates such as textiles, leather and paper, to impart oil (oleophobicity) and water repellent (hydrophobicity) properties to the treated material, and to the preparation of the polymeric products.

Fluorocarbon polymers are extensively used in the textile industry to impart oleophobicity/oil repellency to a fabric. For example, U.S. Pat. No. 5,247,008 describes finishing agents for textiles, leather, paper and mineral substrates which are aqueous dispersions of a copolymer of a perfluoroalkyl acrylate or methacrylate, an alkyl acrylate or methacrylate and an aminoalkyl acrylate or methacrylate.

U.S. Pat. No. 5,068,295 describes a water and oil repellent comprising a copolymer of a perfluoroalkyl acrylate or methacrylate, a polyorganosiloxane containing a vinyl group and a vinyl monomer containing an isocyanate or blocked isocyanate group.

U.S. Pat. No. 6,582,620 and U.S. Pat. No. 5,883,185 describe a treating composition for textiles to render them water and oil repellent obtained by cohydrolysis and condensation of (A) a fluorinated alkyl-bearing alkoxysilane, (B) an amino-bearing alkoxysilane, and (C) an alkoxysilyl-bearing polyorganosiloxane.

U.S. Pat. No. 5,536,304 describes application of a blend of a succinic anhydride-terminated polydimethylsiloxane and a poly(fluoroalkyl methacrylate) to cotton to give a fabric with oil repellency.

U.S. Pat. No. 6,472,019 describes treating a textile with a water- and oil-repellent agent comprising a fluorine-containing polymer and a sulfated fatty acid compound.

One of the major disadvantages of topical finishes prepared with fluorocarbon polymers is that they impart a harsh feel to the fabric surface. There is a need for textile treatment agents which impart oleophobicity and oil repellency to fabrics without imparting a harsh feel to the fabric surface, and preferably whilst at the same time imparting an improvement in feel compared to untreated fabric.

A polymeric product according to the invention having oil repellent properties comprises an amino-functional polysiloxane (A) bonded through its amino groups to an addition copolymer (B) of (B1) a fluoro-substituted alkyl ester of an olefinically unsaturated carboxylic acid and (B2) an olefinically unsaturated monomer having a functional group capable of reacting with the amino groups of polysiloxane (A) and optionally (B3) one or more olefinically unsaturated comonomers.

The invention includes a process for the preparation of a product having oil repellent properties in which an amino-functional polysiloxane (A) is reacted with an addition copolymer (B) of (B1) a fluoro-substituted alkyl ester of an olefinically unsaturated carboxylic acid and (B2) an olefinically unsaturated monomer having a functional group capable of reacting with the amino groups of polysiloxane (A) and optionally (B3) one or more olefinically unsaturated comonomers.

The amino-functional polysiloxane (A) is preferably a polydiorganosiloxane containing aminoalkyl groups attached to silicon. The aminoalkyl groups can be terminal groups to the polydiorganosiloxane and/or pendant to the polydiorganosiloxane chain. The amino groups are preferably primary or secondary amino groups and the aminoalkyl groups are preferably of the formula

wherein A and A' are each independently a linear or branched alkylene group having 1 to 6 carbon atoms; q=0-4; and R is hydrogen or an alkyl or hydroxyalkyl group having 1 to 4 carbon atoms. Most preferably R is hydrogen; q=0 or 1; and A and A' (if present) each contain 2 to 4 carbon atoms. Examples of preferred aminoalkyl groups include —(CH$_2$)$_3$NH$_2$, —(CH$_2$)$_4$NH$_2$, —(CH$_2$)$_3$NH(CH$_2$)$_2$NH$_2$, —CH$_2$CH(CH$_3$)CH$_2$NH(CH$_2$)$_2$NH$_2$, (CH$_2$)$_3$NHCH$_2$CH$_2$NH(CH$_2$)$_2$NH$_2$, —CH$_2$CH(CH$_3$)CH$_2$NH(CH$_2$)$_3$NH$_2$, (CH$_2$)$_3$NH(CH$_2$)$_4$NH$_2$ and —(CH$_2$)$_3$O(CH$_2$)$_2$NH$_2$.

For many functional group-containing monomers (B2), the amino-functional polysiloxane (A) can contain tertiary amino groups. The aminoalkyl groups attached to silicon can be of the formula

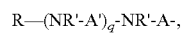

where A, A', q and R are defined as above and each R' is hydrogen or an allyl or hydroxyalkyl group having 1 to 4 carbon atoms.

The groups attached to silicon other than aminoalkyl groups are generally optionally substituted alkyl, aryl or aralkyl groups and are preferably alkyl groups having 1 to 4 carbon atoms, most preferably methyl groups. The polysiloxane is preferably linear but can be branched, for example it can contain branching units such as CH$_3$SiO$_{3/2}$ units, but such branching units preferably form no more than 5 mole % of the polysiloxane.

The amino-functional polysiloxane used in the invention can for example be of the formula

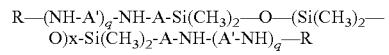

where A, A', R and q are defined as above and x is for example 4-1000, or may have the formula

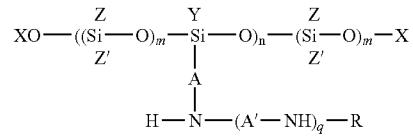

where A, A', R and q are defined as above; Y is an optionally substituted alkyl or aryl group; Z and Z', which can be the same or different, are each an optionally substituted alkyl, aryl or aralkyl group; X is hydrogen or an aliphatic group, preferably an alkyl group having 1 to 30, particularly 6 to 20, carbon atoms, or a triorganosilyl group such as trimethylsilyl; m is for example 4-1000; and n is for example 1-1000, preferably 2-100. The preparation of such amino-functional polysiloxanes is described in WO-A-03/16380.

The copolymer (B) is generally produced by addition polymerisation of the fluoro-substituted alkyl ester (B1) of an olefinically unsaturated carboxylic acid with the olefinically unsaturated monomer (B2) having a functional group capable of reacting with the amino groups of polysiloxane (A) and optionally with one or more olefinically unsaturated comonomers. (B3). The olefinically unsaturated carboxylic acid is preferably acrylic or methacrylic but can alternatively be maleic, fumaric or itaconic acid.

The fluoro-substituted alkyl ester monomer (B1) is preferably an acrylate or methacrylate ester of the formula $CH_2=C(R'')COO-D-Rf$ or $CH_2=C(R'')COO-Rf$, where Rf is a branched or linear fluoroalkyl group having 3 to 21 carbon atoms, R'' is H or methyl, and D is a divalent organic group. D may for example be a linear or branched alkylene group having 1 to 20 carbon atoms, for example a group of the formula $—(CH_2)_x—$ where x is 1 to 10, a group of the formula $—SO_2N(R^1)R^2—$ or of the formula $—CON(R^1)R^2—$, where $R^1$ is an alkyl group having 1 to 10 carbon atoms and $R^2$ is a linear or branched alkylene group having 1 to 10 carbon atoms, or a group of the formula $—CH_2CH(OR^3)CH_2—$ where $R^3$ represents a hydrogen atom or an acyl group having 1 to 10 carbon atoms such as formyl or acetyl, or a group of the formula $—Ar—CH_2—$ where Ar is an arylene group optionally having a substituent.

Specific examples of the fluoro-substituted alkyl ester monomer (B1) are

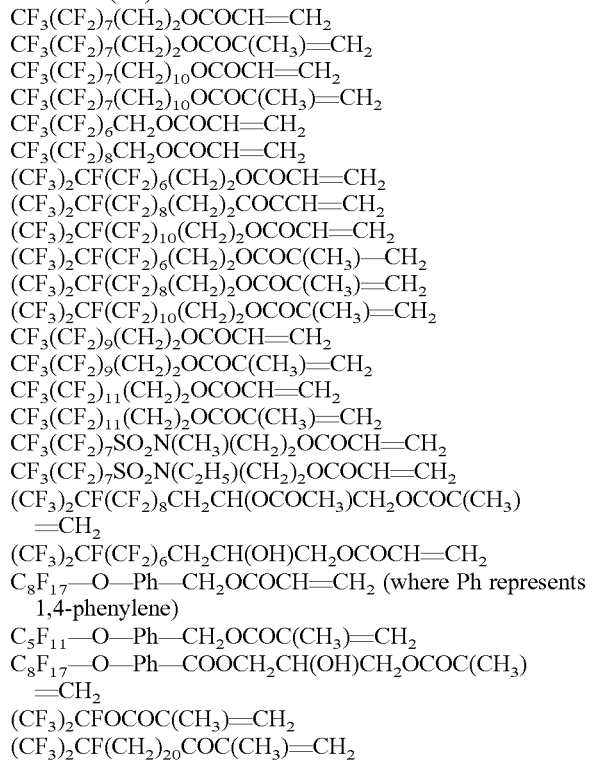

$CF_3(CF_2)_7(CH_2)_2OCOCH=CH_2$
$CF_3(CF_2)_7(CH_2)_2OCOC(CH_3)=CH_2$
$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOCH=CH_2$
$(CF_3)_2CF(CF_2)_6(CH_2)_2OCOCH=CH_2$
$(CF_3)_2CF(CF_2)_8(CH_2)_2COCCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3(CF_2)_9(CH_2)_2OCOCH=CH_2$
$CF_3(CF_2)_9(CH_2)_2OCOC(CH_3)=CH_2$
$CF_3(CF_2)_{11}(CH_2)_2OCOCH=CH_2$
$CF_3(CF_2)_{11}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$
$C_8F_{17}—O—Ph—CH_2OCOCH=CH_2$ (where Ph represents 1,4-phenylene)
$C_5F_{11}—O—Ph—CH_2OCOC(CH_3)=CH_2$
$C_8F_{17}—O—Ph—COOCH_2CH(OH)CH_2OCOC(CH_3)=CH_2$
$(CF_3)_2CFOCOC(CH_3)=CH_2$
$(CF_3)_2CF(CH_2)_{20}COC(CH_3)=CH_2$ Esters with a relatively long chain perfluoroalkyl moiety such as heptadecafluorodecyl may be preferred as because they have been widely used in the past to give good oil repellency, or esters with a relatively short chain perfluoroalkyl moiety such as nonafluorohexyl may be preferred as being less persistent in the environment. The fluoro-substituted alkyl ester monomer (B1) can if desired be a perfluoroalkyl acrylate or methacrylate such as nonafluorohexyl methacrylate or acrylate.

The olefinically unsaturated monomer (B2) which is copolymerised with (B1) is preferably a substituted alkyl acrylate or methacrylate ester wherein the substituent in the alkyl group is a functional group capable of reacting with the amino groups of polysiloxane (A). The most preferred functional group for reacting with the amino groups is epoxide. The monomer (32) can for example be glycidyl methacrylate or acrylate. The amino-functional polysiloxane (A) can thus be bonded to the copolymer (B) by $—N(R)—CH_2\text{-}CHOH—$ linkages derived from reaction of the amino groups of (A) with epoxide groups in the copolymer (B), where R is hydrogen or an alkyl or hydroxyalkyl group having 1 to 4 carbon atoms.

If the amino groups in the amino-functional polysiloxane (A) are tertiary amino groups, the amino-functional polysiloxane (A) may be bonded to the copolymer (B) by quaternary ammonium-containing linkages derived from reaction of the tertiary amino groups of (A) with epoxide groups in the copolymer (B), such as $—N^+(R)(R')—CH_2\text{-}CHOH—$ linkages or by reaction with carboxyl groups present in copolymer (B).

The functional group capable of reacting with the amino groups of polysiloxane (A) can alternatively be an anhydride, imide, lactone, carboxylic acid, isocyanate or blocked isocyanate group. Anhydride groups react with amino groups to form an amide linkage. Examples of olefinically unsaturated monomers having an anhydride functional group are maleic anhydride and itaconic anhydride. Imide groups react with amino groups to form an amide linkage. An example of an olefinically unsaturated monomers having an imide functional group is maleimide. Lactones react with amino groups to form an amidic ester linkage. Carboxylic acid groups react with amino groups, which can be tertiary, secondary or primary amino groups, at temperatures below about 100° C. to form an ionic salt linkage, and at temperatures above about 100° C. react with primary or secondary amine groups to form an amide linkage. Examples of olefinically unsaturated carboxylic acids are acrylic acid, methacrylic acid and maleic acid.

The addition copolymer (B) optionally includes units derived from one or more olefinically unsaturated comonomers. (B3). Examples of such olefinically unsaturated comonomers include alkyl acrylate or methacrylate esters having 1 to 30 carbon atoms in the alkyl group such as butyl acrylate, ethyl acrylate, methyl acrylate, methyl methacrylate or butyl methacrylate. The alkyl acrylate or methacrylate can be used to adjust the glass transition temperature (Tg) of the copolymer (B); for example an acrylate having a long chain alkyl group of 4-20, particularly 8-20 carbon atoms such as stearyl acrylate or methacrylate, octyl acrylate, 2-ethylhexyl acrylate or dodecylacrylate or methacrylate can be used to form a softer polymer of lower Tg. Copolymers with an allyl acrylate or methacrylate monomer may improve various properties such as water- and oil-repellency and soil releasability, cleaning durability, washing durability and abrasion resistance of such repellency and releasability, solubility in solvent, hardness and feel (handle). Other acrylate or methacrylate comonomers (B3) which can be used are polyethylene glycol acrylate or methacrylate, polypropylene glycol acrylate or methacrylate, methoxypolyethylene glycol acrylate or methacrylate and methoxypolypropylene glycol acrylate or methacrylate, Other olefinically unsaturated comonomers (B3) which can be used are vinyl chloride, vinylidene chloride, styrene, acryonitrile, methacrylonitrile, ethylene, a vinyl alkyl ether, isoprene or a vinyl ester such as vinyl acetate or vinyl propionate. An olefinically unsaturated comonomer (B3) can be used which contains a functional group that, although not reactive with amine groups, may be reactive with other functional groups to give properties such as increased substantivity on textiles and other substrates. Examples of such functional groups are hydroxyl, amino and amide, and examples of olefinically unsaturated comonomers (B3) containing them are acrylamide, methacrylamide, N-methylolacrylamide, hydroxyethyl methacrylate, hydroxyethyl acrylate, 3-chloro-2-hydroxypropyl acrylate or methacrylate, N,N-dimethylaminoethyl acrylate or methacrylate and diethylaminoethyl acrylate or methacrylate.

The addition copolymer (B) can be prepared by free radical polymerisation of the monomers, preferably in solution, for example in a polar organic solvent such as one or more alcohol, ketone or ester solvents selected from butanol, t-butanol, isopropanol, butoxyethanol, methyl isobutyl ketone, methyl ethyl ketone, butyl acetate or ethyl acetate and/or an aromatic hydrocarbon such as xylene, toluene or trimethylbenzene a blend of one or more of these. The initiator for free radical polymerisation is preferably an azo compound such as azobisisobutyronitrile or azoisovaleronitrile (AWN) but can be a peroxide such as benzoyl peroxide. The polymerisation temperature can for example be in the range 50-120° C.

The reaction between the amino-functional polysiloxane (A) and the addition copolymer (3) is preferably carried out in solution, for example in a polar organic solvent as described above. The reaction can conveniently be carried out by adding the amino-functional polysiloxane (A) to a solution of addition copolymer (B), for example the solution resulting from polymerisation. The reagents are usually heated to effect reaction. The preferred temperature of reaction depends on the nature of the functional group in monomer (12) which reacts with the amino groups of polysiloxane (A). When the functional group is an epoxide group, for example when monomer (B2) is glycidyl methacrylate, the preferred temperature of reaction is generally in the range 60-120° C.

The amino-functional polysiloxane (A) and the addition copolymer (B) can be reacted in various proportions. For example the amino groups of (A) may be present in stoichiometric excess over the functional groups derived from monomer (B2), forming a polymeric product having residual unreacted amino groups. Such a polymeric product may be preferred for greater substantivity to fibrous substrates or softness of handle of the treated material. Alternatively the polysiloxane and the addition copolymer can be reacted in approximately stoichiometric amounts of amino groups of (A) and functional groups derived from monomer (B2), or the functional groups derived from monomer (B2) may be present in stoichiometric excess over the amino groups of (A), forming a polymeric product bearing substantially no residual unreacted amino groups. Such a polymeric product may be preferred for maximum hydrophobicity.

The polymeric product of reaction is generally obtained as a solution. It can be isolated by evaporation of the solvent. For application as an oil repellent, the polymeric product is generally required in liquid form and the solution obtained by reaction can often be diluted to a solution suitable for application to textiles. Alternatively the polymeric product can be dissolved in a different solvent for application to textiles, for example in a polar organic solvent of higher boiling point. The polymeric product can alternatively be emulsified by mixing with water and an emulsifying agent, such as a cationic surfactant and/or a nonionic or anionic surfactant. The polymeric product can be isolated before emulsification or the reaction product solution can be emulsified, optionally with removal of solvent.

The solution or emulsion of polymeric product can be applied to fibrous substrates such as textiles by any of the methods known for treatment of textiles with liquids. The concentration of the polymeric product in the solution applied to the textile can for example be 0.5 to 20% by weight, preferably 1 to 5%. When the textile is a fabric, the fabric can be immersed in the solution or can be padded or sprayed with the solution. The treated textile is dried and is preferably heated, for example at 100-200° C., to develop the oil repellency.

The textile which is treated is preferably a fabric, including woven, knitted and nonwoven fabrics, fabrics in garment form and carpet, but can be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The process of the invention generally also renders the textile hydrophobic and water repellent. Fabric treatment with the polymeric product of the invention imparts oil repellency to fabrics whilst at the same time imparting an improvement in feel compared to untreated fabric and also imparting an improvement in feel compared to fabric treated with an unmodified fluoropolymer textile treatment agent such as polymer (B) used alone.

The fibrous substrate can alternatively be leather. The polymeric product can be applied to leather from aqueous solution or emulsion at various stages of leather processing, for example during leather wet end processing or during leather finishing, to render the leather hydrophobic and/or oleophobic.

The fibrous substrate can alternatively be paper. The polymeric product can be applied to preformed paper or at various stages of papermaking, for example during drying of the paper.

The invention is illustrated by the following Examples

Evaluation on Textile Fabrics

EXAMPLE 1

To a three necked round bottomed flask were charged $CH_2=C(CH_3)COO(CH_2)_2C_8F_{17}$ (Monomer FM) (24 g), stearyl acrylate (10 g) and glycidyl methacrylate (6 g). To this was added butan-1-ol (30 g) and xylene (30 g) followed by AIVN (0.6 g). The reaction mixture was heated to 90° C. under a stream of nitrogen and held at this temperature for 150 minutes, upon which an aminofunctional siloxane $H_2N(CH_2)_3SiMe_2O(SiMe_2O)_{10}SiMe_2(CH_2)_3NH_2$ (20 g) dissolved in 2-butanone (20 g) was added. The reaction mixture was then held at 90° C. for a further four hours to yield a solution of a siloxane modified fluoro/organic polymeric product.

EXAMPLE 2

To a three necked round bottomed flask were charged Monomer FM (24 g), stearyl acrylate (10 g) and glycidyl methacrylate (6 g). To this was added butan-1-ol (30 g) and xylene (30 g) followed by AIVN (0.6 g). The reaction mixture was heated to 90° C. under a stream of nitrogen and held at this temperature for 150 minutes, upon which an aminofunctional siloxane $H_2N(CH_2)_3SiMe_2O(SiMe_2O)_{50}SiMe_2(CH_2)_3NH_2$ (20 g) dissolved in 2-butanone (20 g) was added. The reaction mixture was then held at 90° C. for a further four hours to yield a solution of a siloxane modified fluoro/organic polymeric product.

EXAMPLE 3

To a three necked round bottomed flask were charged fluoromethacrylate monomer (24 g), stearyl acrylate (10 g) and glycidyl methacrylate (6 g). To this was added butan-1-ol (30 g) and xylene (30 g) followed by AIVN (0.6 g). The reaction mixture was heated to 90° C. under a stream of nitrogen and held at this temperature for 150 minutes, upon which an aminofunctional siloxane of general structure

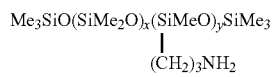

[I]

(20 g-0.38% by weight Nitrogen) dissolved in 2-butanone (20 g) was added. The reaction mixture was then held at 90° C. for a further four hours to yield a solution of a siloxane modified fluoro/organic polymeric product.

EXAMPLE 4

To a three necked round bottomed flask were charged fluoromethacrylate monomer (24 g), stearyl acrylate (10 g) and glycidyl methacrylate (6 g). To this was added butan-1-ol (30 g) and xylene (30 g) followed by AIVN (0.6 g). The reaction mixture was heated to 90° C. under a stream of nitrogen and held at this temperature for 150 minutes, upon which an aminofunctional siloxane of general structure

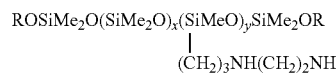

[II]

(R is a mixture of linear and branched hydrocarbons C13)

(20 g-0.41% by weight Nitrogen) dissolved in 2-butanone (20 g) was added. The reaction mixture was then held at 90° C. for a further four hours to yield a solution of a siloxane modified fluoro/organic polymeric product.

REFERENCE EXAMPLE C1

To a three necked round bottomed flask were charged fluoromethacrylate monomer (24 g) and stearyl acrylate (log). To this was added butan-1-ol (30 g) and xylene (30 g) followed by AIVN (0.6 g). The reaction mixture was heated to 90° C. under a stream of nitrogen and held at this temperature for 150 minutes to yield a solution of a fluoro/organic co-polymer.

Comparative Tests

The oil-repellency and water repellency of the fluorsilicone samples were evaluated on cotton weave and cotton polyester weave fabric. The polymers obtained in the above examples were dissolved in 2-butanone to yield a solution concentration of the polymer of 2% by weight. Samples of fabric were immersed in the solution for sixty seconds, allowed to drip dry, followed by heating at 150° C. for three minutes. The samples were cooled and left for one hour at room temperature prior to contact angle measurements. The oil repellency was evaluated using the AATCC 118-1992 test method and the water repellency was evaluated using the spray test AATCC 22-1989. The results are summarized in tables one and two.

TABLE 1

Oil repellency data for cotton and cotton polyester weave fabrics.

| | Cotton | Cotton/PE |
|---|---|---|
| Example 1 | 5 | 5 |
| Example 2 | 5 | 5 |
| Example 3 | 5 | 5 |
| Example 4 | 5 | 5 |
| Reference C1 | 5 | 5 |

TABLE 2

Water repellency data for cotton and cotton polyester weave fabrics.

| | Cotton | Cotton/PE |
|---|---|---|
| Example 1 | 80 | 90 |
| Example 2 | 80 | 90 |
| Example 3 | 90 | 90 |
| Example 4 | 90 | 90 |
| Reference C1 | 80 | 90 |

The handle of the fabrics were also assessed for their softness/feel compared to the untreated fabric and given the following ratings relating to feel 3—Harsher than untreated fabric
2—Similar to untreated fabric
1—Improved softness compared with untreated fabric The results are shown in Table 3 below

TABLE 3

Handle ratings for cotton and cotton polyester treated fabrics.

| | Handle rating Treated Cotton | Handle rating Treated Cotton/Polyester |
|---|---|---|
| Example 1 | 1 | 1 |
| Example 2 | 1 | 1 |
| Example 3 | 1 | 1 |
| Example 4 | 1 | 1 |
| Reference C1 | 2/3 | 2/3 |

It can be seen from Table 3 that all the polymeric products of the Examples improved the softness and feel of the fabrics, whereas the unmodified fluoropolymer C1 did not improve the feel of the fabric and gave a handle that was perceived by some testers as harsher than untreated fabric.

Evaluation on Leather (Leather Wet-end)

The fluorosilicone prepared in Example 4 was diluted in 2-butanone to a solids content of 10% w/w. The resulting solution was then dispersed in decamethylcyclopentasiloxane (D5 fluid) to yield a solids content for the fluorosilicone of 2% w/w. A sample of chrome tanned bovine leather (150 mm×150 mm) was immersed in the solution and then air dried for 24 hours to remove the solvent and D5 fluid.

The water repellency of the treated bovine leather was then evaluated using the SATRA (Shoe and Allied Trades Research Association) Maeser test according to the SATRA PM 34 test method, which measures the number of flexes before water starts to penetrate through the leather sample. The leather was evaluated in comparison with untreated chrome tanned leather (control) and with leather treated with a 2% w/w solution of polydimethylsiloxane. The results are shown in Table 4 below. The accepted industry standard is at least 40,000 Maeser flexes before sample failure. Number of flexes at failure is obtained by visual inspection of the sample. Noticing water transfer in the following forms is considered the point of failure:
  i) Water beads pushing through the sample and collecting on the flesh side with a high contact angle.
  ii) Small or large damp areas appearing on the flesh side and increasing in size.
  iii) Water rushing through the sample in large volumes and at a high rate.

Water absorbance=P
Water transmitted=M

TABLE 4

| Sample Name | $P_{10\,000}$ | $M_{10\,000}$ | $P_{100\,000}$ | $M_{100\,000}$ | Number of flexes at failure |
|---|---|---|---|---|---|
| Example 4 | 5.06% | 0.0 g | 11.36% | 0.0 g | 100 000+ |
| Control | 105% | 2.562 g | — | — | 11 |
| Polydimethylsiloxane | 71.51% | 0.4232 g | — | — | 5 |

The test on the leather treated with the fluorosilicone prepared in Example 4 was stopped at 100,000 flexes, with very little water absorbance and no water transmittance.

Leather Finishing

A sample of chrome tanned bovine nubuck leather (240 mm×150 mm) was treated with the fluorosilicone of Example 4 which had been dissolved in methylethylketone to give a solids content of 2% w/w. The fluorosilicone was sprayed onto the leather surface using a back and forth motion for each application. The water repellency of the treated leather was evaluated using a mixture of water and ethanol (85:15 weight ratio) as reported in Table 5

TABLE 5

| | Time to absorb the droplet | | | |
|---|---|---|---|---|
| | Blank | Additive application after the fixation | | |
| | No silicone | 1 application | 2 applications | 3 applications |
| Nubuck | 20 secs | >10 mins* | >10 mins* | >10 mins* |

*Drop evaporates without penetration into the leather (*) Drop evaporates without penetration into the leather The oil repellency was tested using samples of olive oil and hexadecane, as reported in Table 6

TABLE 6

| | Time to absorb the droplet | | | |
|---|---|---|---|---|
| | | Additive application after the fixation | | |
| | Blank | 1 application | 2 applications | 3 applications |
| Olive oil | 20 secs | >10 mins* | >10 mins* | >10 mins* |
| Hexadecane | 1 sec | >10 mins* | >10 mins* | >10 mins* |

*The droplet beads with no staining or spotting of the leather surface

The invention claimed is:

1. A process for rendering a textile fabric hydrophobic and oleophobic wherein a polymeric product comprising an amino-functional polysiloxane (A) bonded through its amino groups to an addition copolymer (B) of (B1) a fluoro-substituted alkyl ester of an olefinically unsaturated carboxylic acid and (B2) an olefinically unsaturated monomer having a functional group capable of reacting with the amino groups of polysiloxane (A) and optionally (B3) one or more olefinically unsaturated comonomers is applied to the textile fabric.

2. The process according to claim 1 wherein the amino-functional polysiloxane (A) is a polydiorganosiloxane containing aminoalkyl groups of the formula R—(NH-A')$_q$-NH-A- attached to silicon, wherein A and A' are each independently a linear or branched alkylene group having 1 to 6 carbon atoms; q=0-4; and R is hydrogen or an alkyl or hydroxyalkyl group having 1 to 4 carbon atoms.

3. The process according to claim 1 wherein the fluoro-substituted alkyl ester monomer B1 is an acrylate or methacrylate ester of the formula $CH_2$=C(R")COO-D-Rf or $CH_2$=C(R")COO-Rf where Rf is a branched or linear fluoroalkyl group having 3 to 21 carbon atoms, R" is H or methyl, and D is a divalent organic group.

4. The process according to claim 1 wherein the monomer B2 is a substituted alkyl acrylate or methacrylate ester wherein the substituent in the alkyl group is a functional group capable of reacting with the amino groups of polysiloxane (A).

5. The process according to claim 1 wherein the amino-functional polysiloxane (A) is bonded to the copolymer (B) by
   —N(R)—CH2-CHOH— linkages derived from reaction of the amino groups of (A) with epoxide groups in the copolymer (B), where R is hydrogen or an alkyl or hydroxyalkyl group having 1 to 4 carbon atoms.

6. The process according to any claim 1 wherein the functional group in monomer (B2) capable of reacting with the amino groups of polysiloxane (A) is an anhydride, lactone, imide, carboxylic acid group, isocyanate or blocked isocyante.

7. The process according to claim 1 wherein the copolymer (B) contains a comonomer (B3) which is an alkyl acrylate or methacrylate having 1 to 30 carbon atoms in the alkyl group.

8. A process for rendering leather hydrophobic and oleophobic wherein a polymeric product comprising an amino-functional polysiloxane (A) bonded through its amino groups to an addition copolymer (B) of (B 1) a fluoro-substituted alkyl ester of an olefinically unsaturated carboxylic acid and (B2) an olefinically unsaturated monomer having a functional group capable of reacting with the amino groups of polysiloxane (A) and optionally (B3) one or more olefinically unsaturated comonomers is applied to the leather either during wet end processing or leather finishing.

9. A process for rendering paper hydrophobic and oleophobic wherein a polymeric product comprising an amino-functional polysiloxane (A) bonded through its amino groups to an addition copolymer (B) of (B1) a fluoro-substituted alkyl ester of an olefinically unsaturated carboxylic acid and (B2) an olefinically unsaturated monomer having a functional group capable of reacting with the amino groups of polysiloxane (A) and optionally (B3) one or more olefinically unsaturated comonomers is applied to the paper.

* * * * *